United States Patent [19]

Akashi

[11] Patent Number: 4,624,350
[45] Date of Patent: Nov. 25, 1986

[54] GEAR SHIFT DEVICE FOR VEHICLES

[75] Inventor: Tomohiko Akashi, Tokyo, Japan

[73] Assignee: Honda Giken Kogyo Kabushiki Kaisha, Tokyo, Japan

[21] Appl. No.: 649,447

[22] Filed: Sep. 11, 1984

[30] Foreign Application Priority Data

Sep. 17, 1983 [JP] Japan ............... 58-171496

[51] Int. Cl.⁴ .......... B60K 41/26; F16H 57/06; B62K 3/06
[52] U.S. Cl. ............... 192/4 C; 74/337.5; 74/476; 74/489; 74/526
[58] Field of Search ........ 74/337.5, 474, 476, 74/489, 526; 192/4 C

[56] References Cited

U.S. PATENT DOCUMENTS

| | | | |
|---|---|---|---|
| 1,431,207 | 10/1922 | Alspaugh | 192/4 C X |
| 2,344,881 | 3/1944 | Jory | 192/4 C X |
| 2,936,864 | 5/1960 | Schjolin et al. | 192/4 C |
| 4,455,884 | 6/1984 | Tsuruta et al. | 74/337.5 X |

FOREIGN PATENT DOCUMENTS

| | | | |
|---|---|---|---|
| 457697 | 5/1950 | Italy | 74/489 |
| 57-161340 | 10/1982 | Japan | 74/476 |
| 368066 | 4/1963 | Switzerland | 74/489 |

*Primary Examiner*—Allan D. Herrmann
*Attorney, Agent, or Firm*—Lyon & Lyon

[57] ABSTRACT

A gear shift device for vehicles of the type including a reverse speed stage is disclosed. The device is provided with a rotation inhibiting member for inhibiting rotation of a gear shift drum when the latter is caused to turn to the reverse position. The rotation inhibiting member is displaced to the inhibition releasing position by operation of the remote control member only when a vehicle is kept in a braked state, thereby permitting the gear shift drum to turn to the reverse position. With this arrangement, shifting to the reverse speed stage during forward travelling of the vehicle is prevented reliably.

4 Claims, 8 Drawing Figures

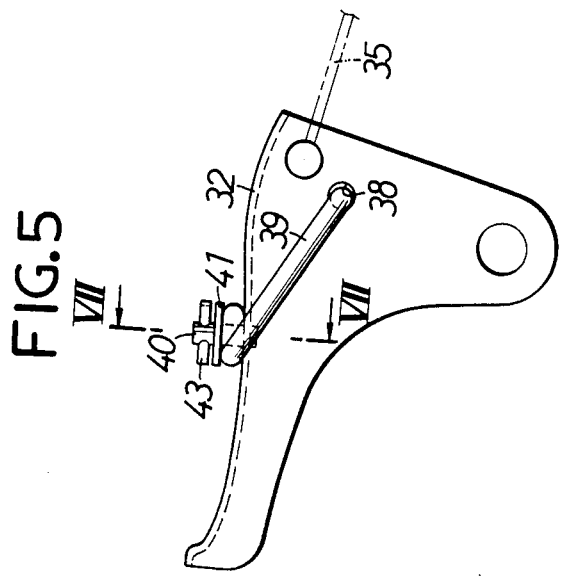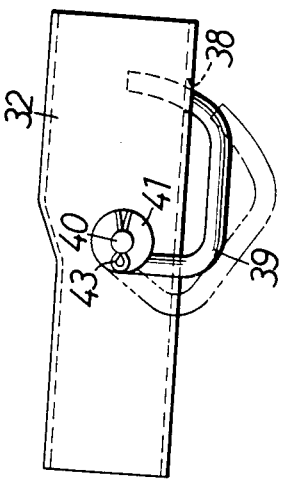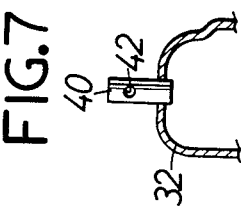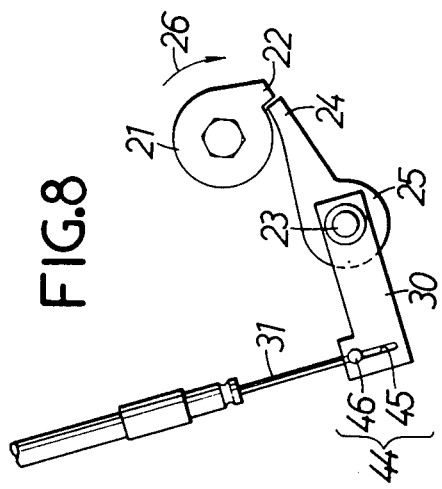

GEAR SHIFT DEVICE FOR VEHICLES

BACKGROUND OF THE INVENTION

The present invention relates to a gear shift device for vehicles and more particularly to a gear shift device for vehicles movable in the rearward direction such as motor tricycles and four-wheeled automobiles like sand buggy car and its object resides in providing a gear shift device for vehicles which enables a reverse speed stage to be established only when braking operation is performed.

SUMMARY OF THE INVENTION

To accomplish the above object, according to the present invention, there is provided a gear shift device for vehicles wherein a gear shift drum is provided thereon with a guide groove for a reverse speed stage into which groove a reverse shift fork is engaged, a rotation inhibiting member for inhibiting rotation of the gear shift drum to the reverse position is disposed displaceably between the rotation inhibiting position and the inhibition releasing position, the rotation inhibiting member being normally urged toward the rotation inhibiting position, and a remote control member is incorporated in a brake actuating system in such a manner that it is allowed to operate, only when the vehicle is kept in a braked state, so as to displace the rotation inhibiting member from the rotation inhibiting position to the inhibition releasing position.

With this arrangement, a brake actuating member is forced to be operated necessarily when a driver wants to move the vehicle rearwardly whereby shifting to the reverse speed stage during forward running of the vehicle can be prevented reliably.

The above and other objects, features and advantages of the invention will become more clearly apparent from reading of the following description of embodiments in conjunction with the accompanying drawings.

BRIEF DESCRIPTION OF THE DRAWINGS

The accompanying drawings will be briefly described below.

FIG. 5 is a front view of a remote control member as illustrated in FIG. 4.

FIG. 6 is a plan view of the remote control member in FIG. 5.

FIG. 7 is a cross-sectional view of the remote control member taken in line VII—VII in FIG. 5 with a locking piece, a washer and a locking pin being removed from illustration.

FIG. 8 is a side view of the device according to another embodiment of the invention similar to FIG. 3.

DESCRIPTION OF THE PREFERRED EMBODIMENTS

Now, the present invention will be described in a greater detail hereunder with reference to the accompanying drawings which illustrate some preferred embodiments thereof as mounted on a sand buggy car.

Figure 1:
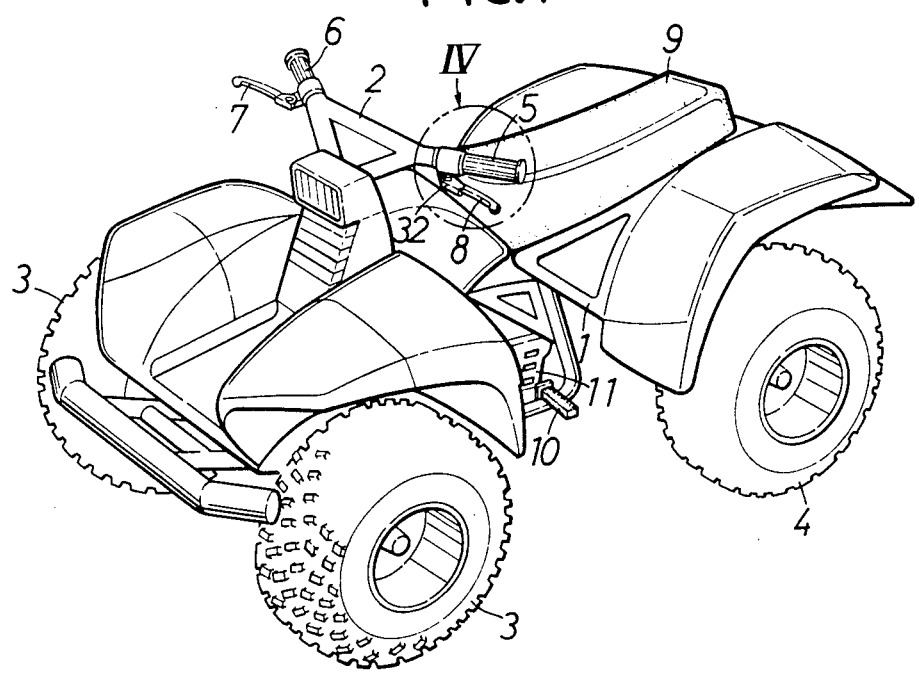
FIG. 1 is a perspective view of a sand buggy car with a gear shift device according to an embodiment of the invention mounted thereon.

Referring first to FIG. 1, a pair of left and right front wheels 8 are rotatably mounted on the front part of a car body 1 so that they are steered by a steering handle 2. Further, a pair of left and right rear wheels 4 are rotatably mounted on the rear part of the car body 1. The steering handle 2 is provided with grips 5 and 6 at both the outermost end parts thereof and a front wheel brake lever 7 adapted to be actuated by a right hand of a driver placed on the righthand grip 6 and a rear wheel brake lever 8 adapted to be actuated by a left hand of the same placed on the lefthand grip 5 are turnably supported on the steering handle 2, respectively. The car body 1 has a seat 9 mounted on that upper part thereof located in the proximity of the rear end thereof on which the driver is to sit in a straddling manner. Further, steps 10 are projected outwardly from both the side walls of the body at the lower, longitudinally central part thereof. An engine 11 is mounted at the central part of the car body 1 and the driving force generated by the engine 11 is transmitted to both the front and rear wheels 3 and 4 via a power transmission mechanism which includes a gear shift device according to the invention and is equipped with an automatic centrifugal clutch or a fluid torque converter.

Figure 2:
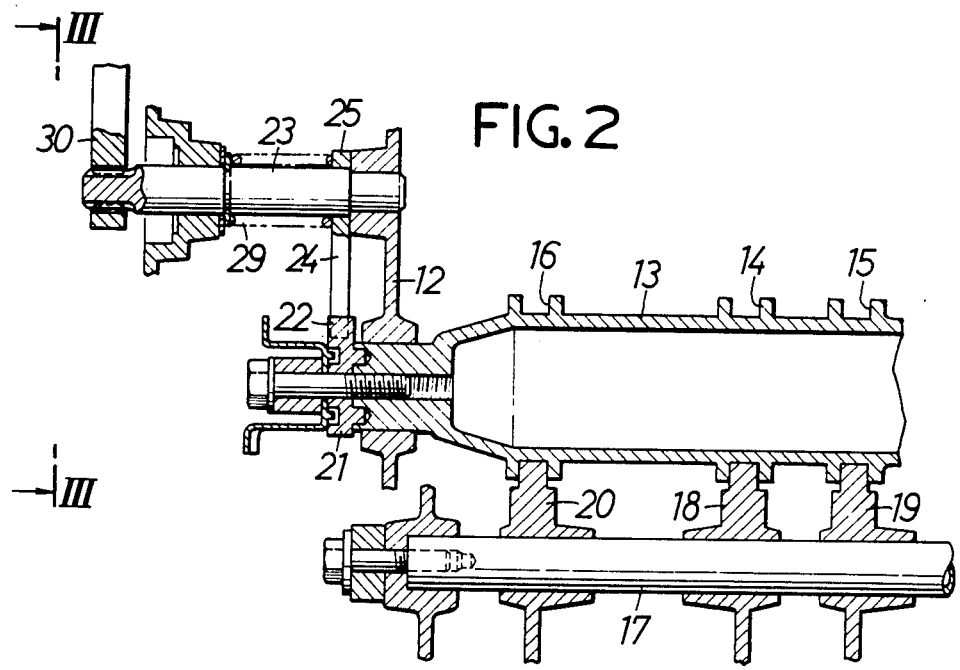
FIG. 2 is a sectional view of the device of the invention, particularly illustrating an essential part thereof in an enlarged scale.

FIG. 2 is a cross-sectional view of an essential part of the gear shift device of the invention. A gear shift drum 13 is rotatably supported on a crankcase 12 of the engine and guide grooves 14 and 15 for gear shifting of two forward speed stages and a guide groove 16 for a reverse speed stage are arranged in a curved manner on the outer periphery of the gear shift drum 13 in an axially-spaced relation from each other. Further, a guide shaft 17 is mounted on the crankcase 12 in parallel with the gear shift drum 13 and shift forks 18, 19 and 20 engaged into the guide grooves 14, 15 and 16 are fitted onto the guide shaft 17 in an axially slidable manner. The gear shift drum 13 is caused to rotate in response to actuation of a speed changing pedal which is not shown in the drawings whereby the shift forks 18, 19 and 20 are selectively displaced on the guide shaft 17 in dependence on the amount of angular displacement of the gear shift drum 13. Selective displacement of the shift forks 18, 19 and 20 causes a gear train to be established for a corresponding speed stage which are not shown in the drawings. Particularly, displacement of the reverse shift fork 20 causes a reverse speed stage gear train to be established.

Figure 3:
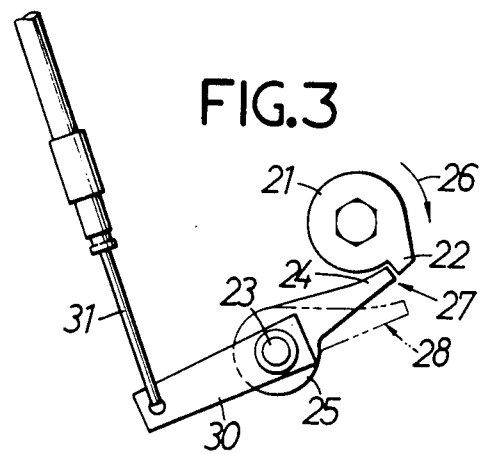
FIG. 3 is a side view of the device as seen from the line III—III in FIG. 2.

Referring also to FIG. 3, the gear shift drum 13 is coaxially and integrally mounted with a disc-shaped rotation limiting member 21 at one end thereof and the rotation limiting member 21 has a limiting projection 22 projected outwardly in the radial direction.

On the other hand, a rotational shaft 23 which has an axis extending in parallel with the gear shift drum 13 is rotatably mounted on the crankcase 12 and a rotation inhibiting member 25 which is provided with a rotation inhibiting arm 24 extending toward the rotation limiting member 21 is fixedly secured to the rotational shaft 23. The rotation inhibiting arm 24 is so arranged as to come in abutment against the limiting projection 22 of the rotation limiting member 21 on the lower side of a rotational direction 26 toward the reverse speed stage (see FIG. 3) just before the gear shift drum 13 rotates to fall into the reverse position, whereas the rotation inhibiting arm 24 is turnable between a rotation inhibiting position 27 where rotation of the rotation limiting member 21 in the direction 26 is inhibited due to abutment of the rotational inhibiting arm 24 against the limiting projection 22 and an inhibition releasing position 28 where rotation of the rotation limiting member 21 in the direction 26 is permitted without causing abutment of the rotation inhibiting arm 24 against the limiting projection 22 (as identified by phantom lines in FIG. 3). It should be noted that the rotational shaft 23 is normally urged to rotate toward the rotation inhibiting position 27 under the effect of resilient force of a coil spring 29 which is mounted around the rotational shaft 23.

An actuating arm 30 extends in a substantially opposite direction to the extending direction of the rotation inhibiting arm 24 with respect to the axis of the rotational shaft 23 and is fixedly secured at one end thereof to the one end of the rotational shaft 23 and a wire 31 is connected to the other end of the actuating arm 30. Specifically, the wire 31 extends from the other end of the actuating arm 30 in the same direction as that of rotation of the rotational shaft 23 toward the inhibition releasing position 28 from the rotation inhibiting position 27, and this wire is connected to a remote control member 32 (see FIG. 1) pivoted on the rear wheel brake lever 8. Accordingly, when a driver grips by his left hand the remote control member 32 and draws the wire 31, the rotational shaft 23 is caused to rotate in the clockwise direction as seen in FIG. 3 against resilient force of the coil spring 29 on the rotational shaft 23, and then the rotation inhibiting member 25 is correspondingly displaced from the rotation inhibiting position 27 to the inhibition releasing position 28.

Figure 4:
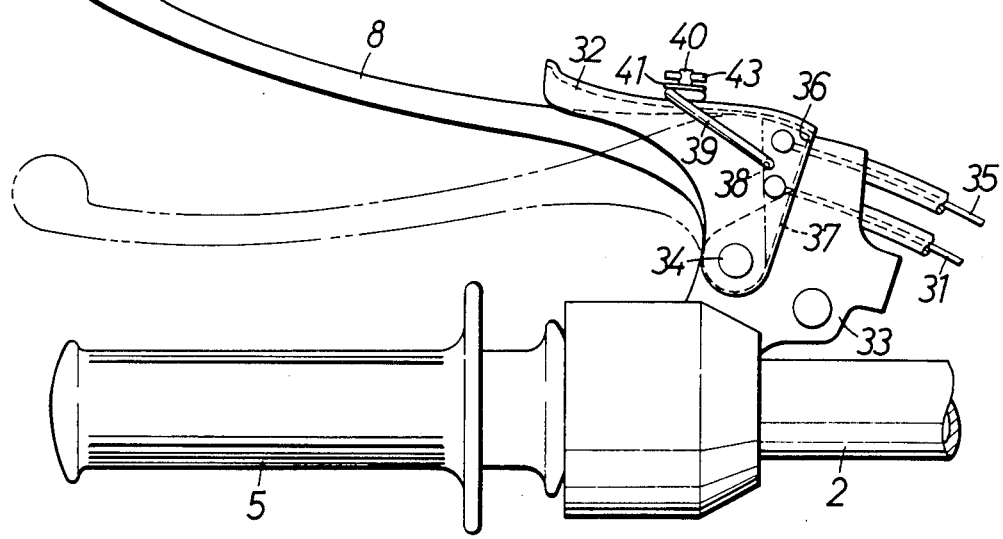
FIG. 4 is an enlarged plan view of the part as identified by an arrow mark IV in FIG. 1.

As illustrated in FIG. 4, a supporting member 33 is immovably mounted on the steering handle 2 at the position located in the proximity of the grip 5 and the rear wheel brake lever 8 is carried on this supporting member 33 to be turnable about a support shaft 34. As the rear wheel brake lever 8 is turned toward the grip 5 by the left hand of the driver, a braking wire 35 is pulled thereby to actuate the rear wheel braking mechanism (not shown). Turning movement of the brake lever 8 away from the grip 5 is restricted by abutment of an end face 37 of the braking lever 8 against a stopper face 36 of the supporting member 33.

Referring also to FIGS. 5 to 7, the remote control member 32 is turnably mounted on the rear wheel braking lever 8 around the same axis as that of the lever 8. Specifically, the remote control member 32 has an inverted U-shaped cross-sectional configuration, which is fitted onto the rear wheel braking lever 8 from the side opposite to the grip 5 and is supported turnably about the shaft 34. Thus, the remote control member 32 can be pivoted toward the grip 5 only when the rear wheel braking lever 8 is actuated for braking operation, and the wire 31 can be pulled as the remote control member 32 is displaced toward the grip 5. Further, turning movement of the remote control member 32 away from the grip 5 is restricted by abutting against the stopper face 36 of the supporting member 33 in the same manner as described above with respect to the rear wheel braking lever 8.

The remote control member 32 is formed with a hole 38 at the position located corresponding to the position assumed by the end face 37 of the rear wheel braking lever 8 when the latter carries out braking operation, into which hole one end of a substantially C-shaped locking piece 39 is fittable. The other end of the locking piece 39 is operatively held by means of a supporting pin 40 which immovably stands upright on the remote control member 32. Specifically, the other end of the locking piece 39 is wound around the supporting pin 40 so that it can be turnably held about the supporting pin 40 by fitting the ring-shaped other end of the locking piece 39 onto the supporting pin 40 and inserting a locking pin 43 through the hole 42 of the supporting pin 40 with a washer 41 interposed between the other end of the piece 39 and the locking pin 40.

Next, operation of the gear shift device of the invention as constructed in the above-described manner will be described below.

When a driver operates his sand buggy car to move rearwardly, he turns the rear wheel braking lever 8 toward the grip 5 with his left hand to perform braking operation. At this moment the remote control member 32 is placed in a condition turnable toward the grip 5. Thus, the wire 31 is pulled by turning the remote control member 32 whereby the rotation inhibiting member 25 is caused to turn from the rotation inhibiting position 27 to the inhibition releasing position 28. As a result, it becomes possible to rotate the gear shift drum 13 to the reverse position and thereby a gear train for reverse speed stage is established by performing shifting operation to the reverse position, which enables the sand buggy car to travel rearwardly.

When he wishes to stop his sand buggy car in certain position, he actuates the rear wheel brake lever 8 toward the grip 5 and inserts the one end of the locking piece 39 into the hole 38 of the remote control member 32 while holding the brake lever 8 in its brake effecting state. This causes the one end of the locking piece 39 to come into contact with the end face 37 of the rear wheel brake lever 8. Since, at this moment, turning movement of the remote control member 32 away from the grip 5 is restricted by the stopper face 36 of the supporting member 33, the rear wheel brake lever 8 is kept in the turned state, that is, in the brake effecting state, by means of the locking piece 39. Accordingly, the rear braking mechanism is kept in the operative state even when the hand of the driver is removed from the rear wheel braking lever 8.

Next, description will be made as to another embodiment of the present invention with reference to FIG. 8.

In this embodiment a lost motion mechanism 44 is disposed between the actuating arm 30 and the wire 31. Specifically, the lost motion mechanism 44 comprises a slot 45 formed on the actuating arm 30 in the direction of pulling of the wire 31 and an engagement piece 46 fixedly secured to the lower end of the wire 31 and displaceably engaged in the slot 45. This specific arrangement of the lost motion mechanism 44 assures that return movement of the rotational shaft 23 from the inhibition releasing position 28 to the rotation inhibiting position 27 under the effect of resilient force of the coil spring 29 is carried out smoothly without any hindrance caused by resistance of the wire 31 during turning movement of the gear shift drum 21 from the reverse position to the neutral position or to the forward running position, that is, in the direction opposite to the rotational direction 26 for reverse speed stage.

As a modification of the foregoing embodiment, the lost motion mechanism may be disposed between the actuating arm 30 and the rotational shaft 23.

While the present invention has been described above with respect to preferred embodiments thereof, it should of course be understood that it should not be limited only to them but various changes or modifications may be made in any acceptable manner without departure from the scope of the invention which is determined only by the appended claims.

What is claimed is:

1. A gear shift device for vehicles of the type including a gear shift drum having a guide groove for reverse speed stage formed thereon, the reverse guide groove being fitted with a reverse shift fork, the gear shift device comprising a rotation inhibiting member for inhibiting rotation of the gear shift drum to a reverse position, the rotation inhibiting member being displaceably disposed between a rotation inhibiting position and an inhibition releasing position and being normally urged toward the rotation inhibiting position, and a remote control member incorporated in a brake actuating system and operated in such a manner that it is allowed, only when a vehicle is braked, to displace the rotation inhibiting member from the rotation inhibiting position to the inhibition releasing position said remote control member being mounted together with a brake lever on a steering handle at a position near a grip in a turnable manner in the same direction as that of the brake lever, said remote control member being adapted to turn so as to allow the rotation inhibiting member to be displaced to the inhibition releasing position only when said brake lever is caused to turn for braking operation.

2. A gear shift device as defined in claim 1, wherein said remote control member is provided with a locking member which serves to hold the brake lever in a brake effecting position and keeps the remote control member in an inoperative state.

3. A gear shift device as defined in any one of claim 1, and 2, further comprising a lost motion mechanism which is adapted to allow the rotation inhibiting member to return to the rotation inhibiting position from the inhibition releasing position when the gear shift drum rotates from a reverse position to any other position.

4. A gear shift device for vehicles of the type including a gear shift drum having a guide groove for reverse speed stage formed thereon, the reverse guide groove being fitted with a reverse shift fork, the gear shift device comprising a rotation inhibiting member for inhibiting rotation of the gear shift drum to a reverse position, the rotation inhibiting member being displaceably disposed between a rotation inhibiting position and an inhibition releasing position and being normally urged toward the rotation inhibiting position, and a remote control member incorporated in a brake actuating system and operated in such a manner that it is allowed, only when a vehicle is braked, to displace the rotation inhibiting member from the rotation inhibiting position to the inhibition releasing position, a lost motion mechanism which is adapted to allow the rotation inhibiting member to return to the rotation inhibiting position from the inhibition releasing position when the gear shift drum rotates from a reverse position to any other position.

* * * * *